Patented July 24, 1934

1,967,261

UNITED STATES PATENT OFFICE 1,967,261

CONDENSATION PRODUCT OF UREA AND FORMALDEHYDE AND METHOD OF MAKING SAME

Kurt Ripper, Vienna, Austria, assignor, by mesne assignments, to Synthetic Plastics Company, Incorporated, New York, N. Y., a corporation of Delaware No Drawing. Application February 3, 1927, Serial No. 165,760. In Austria May 15, 1926

12 Claims. (Cl. 260—3)

This invention relates to the manufacture of a powder which can be pressed and relates also to the working up of this powder into artificial compositions by the action of heat and pressure.

In the manufacture of artificial compositions by the condensation of urea and its compounds and formaldehyde two fundamentally different methods have hitherto been used. According to one method the working conditions are so selected that the whole of the reaction mixture solidifies without the formation of appreciable intermediate stages, to an artificial composition which contains the whole of the water and from which the water only escapes (or evaporates gradually) after very long storage, or that after the cooling of the reaction mixture with the whole of the water, solidifying intermediate products are obtained which are dehydrated by heating or hot pressing. The other method uses for the manufacture of artificial compositions an interrupted heating process in which the water is partially removed previous to the solidification of the reaction mixture. At first initial products which are soluble in water are produced, which on evaporation become more and more viscous and at a given period of time gelatinize to semi-solid intermediate products which contain what water there is still present. By expelling the residual water the formation of the hard artificial compositions is then completed. In a further development of this method the possibility is also provided of imparting hydrophobe properties to the emulsion colloid formed, so that at a given moment a resinous condensation product separates, from which the major portion of the water imported with the initial products and that formed during the reaction can be withdrawn prior to further heating. In the further treatment also of this resin however gelatinization takes place with the inclusion of the dispersion medium still present, so that therefore this remainder must be removed from the cellular structured jelly after its solidification.

Experiments have been made to obtain as anhydrous and hard artificial compositions as possible by a different and shorter way. For this purpose it has been suggested to dry the gelatinized reaction products and press them hot. The unavoidable thorough disintegration of the jellies or hardened final products required for this method is attended by considerable difficulties and in the case of the final products cannot be carried out without contamination by metals. Furthermore the gelatinized products contain all the foreign admixtures which have become incorporated with the jelly by the inclusion of the dispersion medium and which are deleterious to the nature of the artificial composition. All these disadvantages also attend a different suggestion which is to produce from dimethylolurea by the action of acids a porcelain-like condensation product which is then to be powdered, dried and converted into the artificial composition by hot pressing.

The surprising discovery has now been made that well diluted solutions of the sol formed during the action of formaldehyde on urea and its compounds can be made to produce by precipitation by electrolytes or by albumin precipitants, a dehydrated, apparently amorphous, flocculent precipitate which after being dried can be converted by the action of heat and pressure (hot molding) into a completely homogeneous artificial composition. It has now been found that the sols of the emulsion colloids in question behave in a similar manner to the hydrosols of silicic acid. A well purified, not too dilute hydrosol of silicic acid forms as is well known, an unstable system, which always tends to gelatinize, the transition thereof into a jelly including the dispersion medium present taking place all the more quickly the more concentrated the solution is. On the other hand dilute solutions are at once precipitated in a flocculent form by certain electrolytes. The emulsion colloids resulting from the condensation of urea with formaldehyde are often produced as unstable systems inclining to gelatinization. That the colloid is thrown out from suitably diluted solution, as a dehydrated, apparently amorphous, flocculent precipitate, was hitherto entirely unknown. The rule for technical manipulation which results from this new discovery has a most extraordinary scope. It is now possible by hot pressing the flocculent and dried precipitate to produce some of the desired artificial compositions in a time to be measured in minutes. By this method exactly the same rock crystal-like glasses are obtained as are obtained by the best of the methods hitherto known, in fact the nature of these products is superior to the best of the products hitherto obtained in various respects. The compositions are perfectly pure, because the soluble impurities in the finely divided flocculent precipitates can be actually thoroughly removed by a complete washing. The pressed products obtained are also distinguished by a particular power of resistance to fluctuations of temperature and moisture.

In order that the flocculation of the colloids may take place it is necessary that the ratio of electrolyte to the disperse phase should not be below a certain minimum value. This value is distinct for each electrolyte. The quantity of flocculating agent necessary increases as the quantity of colloid increases in the same volume of dispersion medium. To give a guiding line for the dilutions which are necessary in order to obtain, instead of the unstable system inclining to gelatinize, a sol which is precipitated by electrolytes, it may be mentioned that the sol is diluted conveniently to such a degree that about 150 grams of carbamide are contained per liter of liquid.

As floccularizing media all acids in particular and such compounds as split off hydrogen ions in solution such as acid salts, acid esters or the like may be used, also compounds which form hydrogen ions in the solution by decomposition, such as ammonium salts, hydrogen peroxide or the like. In like manner act also such compounds which split off hydroxyl ions such as bases, basically reacting salts or the like, a fact which is in accordance with previous experiences in connection with precipitation of sols by electrolytes. The third group of floccularizing media includes all albumin precipitants, such for example as tanning materials of both natural and synthetic origin, also phosphotungstic acid and the like. The action of all these floccularizing media can be increased by lyotropic neutral salts. The effects of the floccularizing media of these various groups may also overlap.

If the diluted colloid solution be mixed with one of the hereinbefore mentioned floccularizing media, the formation of flocculæ takes place at once or after some time only; it may also be accelerated by warming up the solution. If this is done the reaction mixture may be conveniently stirred. The commencement of coagulation is manifested by a cloudiness, after which in a short time a coarsely flocculent, voluminous precipitate is thrown down. The commencement and duration of complete flocculation depend on the temperature at which it takes place and on the intensity of the stirring as well as on the nature and quantity of the flocculant.

Instead of starting from dilute solutions of the finished sol the corresponding dilute mixture of the raw products or the primary condensation products obtained by briefly heating, this mixture may be mixed after being suitably diluted with the flocculants in suitable quantities, so that on further heating the dehydrated, flocculent precipitate, is produced in a single operation the sol being flocculated so to speak in statu nascendi. This second method is particularly to be recommended in cases where it is desired to make use of the method previously proposed for the production of a hydrophobe resin (see the method described in my U. S. Patent No. 1,833,868). Such a hydrophobe resin separates out when the condensation products primarily formed by briefly warming the mixture of the initial products mixed with organic substances which are capable of forming condensation products with formaldehyde in an acid medium, such as thiourea or phenol, are further heated. If on the other hand the mixture of initial products (or the condensation products primarily formed prior to the action of thiourea, phenol or the like) be correspondingly diluted and the suitable quantities of flocculants added, there will take place on further heating instead of the separation of the hydrophobe resin the precipitation in a flocculant form of the colloid as a dehydrated, flocculant precipitate. This precipitate is of the same nature as those described in the foregoing paragraphs. Also albuminoid precipitants may be of use as flocculants in addition to those substances added which raise the concentration of the hydrogen ions.

The further treatment of the precipitate obtained by flocculation is in all cases the same.

The soft easily compressible precipitate, which is similar to freshly prepared casein, is freed as completely as possible or desired, from the medium from which it has been flocculated, by washing it with water. This washing is continued until all soluble admixed substances, such as flocculants, unchanged initial and intermediate reaction products have been removed. After being washed for a short time the precipitate loses its flocculent nature and becomes transformed into an extremely light powder, the fineness of which is so great that the individual particles thereof are only visible when magnified 310 times. After being stored for a short time in air or after washing with spirit and ether the anhydrous condensation product is obtained as a fine dazzlingly white apparently amorphous powder.

This powder is insoluble in the cold in the ordinary solvents particularly in water. It dissolves easily in acids and can be separated from these solutions by flocculation. Heated particularly if increased pressure be simultaneously used, it dissolves both in formaldehyde and also in most of those solvents of high boiling point which contain a hydroxyl group, particularly as glycerine, the chlorhydrins, benzyl alcohol or the like.

The most important use for this powder is the manufacture of colorless pressed articles. It has been found that the powder, particularly when it is mixed with small quantities of dispersion media, can be molded under heat and pressure into glass clear objects. The glass clear pressed objects thus obtained possess the same optical and mechanical properties (higher refractive index, transparency to ultraviolet rays, extraordinarily great strength and elasticity) as the products obtained by the previously known processes and may be used as such for every imaginable kind of purpose by virtue of their optical and mechanical properties. The raw material may either be produced for subsequent treatment mechanically or articles of all kinds may be produced ready for use in a single pressing operation.

This powder may however be combined and pressed together with fibrous or pulverulent filling materials of all kinds and of either organic or inorganic origin. The mixture of the product with the filling materials may be conveniently effected by distributing the latter in the aqueous colloidal solution and precipitating them conjointly with the urea formaldehyde condensation product. The procedure may however be such as is usual in all such kinds of mixtures. Thus for example separate sheets of paper, celluloid or a fabric may be strewn with the powder and pressed down upon each other hot, so that a homogeneous pressed product is formed. In this way materials are obtained which possess particularly high mechanical strength and electrical insulating power. The electrical insulating power of the pressed products, which are produced by the use of insulating filling and fibrous materials with cellulose, asbestos, china clay, etc. is likewise extraordinarily high.

The process affords however principally, as above stated, a method of obtaining transparent and translucent pressed articles and objects. In this way it is possible to produce on the one hand substitutes for rock crystal, porcelain, glass, semiprecious stones, amber, alabaster and the like such as are used and sought after in the turned goods trade while on the other hand it is possible to produce by this method in a hot press molded articles of use directly of the appearance of the aforementioned products. This is the first process by the aid of which such hollow articles as drinking glasses, basins, lamp shades, tubes or the like can be produced, such as are required principally in the glass trade. The process is therefore for this reason of very great technical importance.

The color of the pressed powder may be imparted thereto either before or during the precipitation thereof, or during the molding operation by the addition of soluble dyestuffs or pigment colors. As clouding media finely powdered, fibrous, liquid substances insoluble in the colloid may be used. For example oxides of rare earths, such as titanium oxide, zirconium oxide, oils etc. may be used. For the production of special effects illuminating colors, radioactive substances etc. may be added. All other effects involved here such as the production of cloudy, mottled, semi-cloudy, fluorescent or irridescent compositions may be attained as desired. Other methods of producing the above optical effects will occur readily to one skilled in the art.

It is also obvious that the finely powdered compositions obtained, may be used, after dissolving the same, as such or mixed with filling or coloring agents as varnishes, adhesives binding agents or impregnating materials in the usual way. In this case subsequent heating is not required.

Example 1

30 parts by weight of pure neutrally reacting urea are mixed with 100 parts by weight of an acid free or neutralized or faintly alkaline 30% aqueous solution of formaldehyde and heated to boiling under a reflux condenser. After being boiled up for a short time 5 parts by weight of boric acid dissolved in a little water are added to the reaction mixture after which the whole mixture is boiled up for a further period of time under the reflux condenser. 50 parts by weight of the liquid intermediate product thus obtained are diluted with 50 parts by weight of water, and mixed with 0.3 part by weight of 2 N hydrochloric acid and kept at about 90 degrees C., whilst being stirred. After about half an hour 100 parts by weight of water are added. The flocculent precipitate produced is then separated from the mother liquor purified most carefully from all soluble admixtures and freed from adhering water by spirit. After a short drying the powder is ready for use.

Example 2

In place of the 2 N hydrochloric acid used in Example 1 the same amount of 2 N formic acid or the corresponding quantity of an acid salt, particularly alum may be used as the flocculant.

Example 3

100 parts by weight of the diluted solution made according to Example 1 are mixed with 1.6 parts by weight of solid sodium hydroxide, which is dissolved in as little water as possible, and allowed to stand for 2 hours at 90 degrees. After this time a coarsely flocculent precipitate will have been thrown down, which can be further treated exactly as described in Example 1.

Example 4

1312 parts by weight of 40% formaldehyde are mixed with 1888 parts by weight of water, 12 parts by weight of 10% sodium hydrate solution and 480 parts by weight of carbamide. After being boiled up for a short time 80 ccm. of 2 N hydrochloric acid are added, after which the mixture is allowed to boil for several hours under a reflux condenser. A large quantity of a flocculent precipitate forms which is worked up in the manner above described and can be dried.

Example 5

262 parts by weight of 40% formaldehyde solution are mixed with 698 parts by weight of water, 2 parts by weight of a 10% solution of sodium hydrate and 96 parts by weight of carbamide. After being boiled for a short time this mixture has added to it 1 part by weight of concentrated formic acid and 32 parts by weight of thiourea and the whole mixture further heated. After a quarter of an hour the boiling reaction mixture begins to turn opalescent. After 1½ hours a very heavy flocculent precipitate has been thrown down. After cooling the precipitate is washed and dried exactly as described in Example 1.

Example 6

The powder produced according to Examples 1 to 5 is pressed with a specific pressure of 900 kg. per sq. cm. at a temperature of from 120 to 130 degrees C. Under these conditions glass clear, perfectly transparent pressed articles, which in contradistinction to the products of the hitherto known processes for the manufacture of artificial compositions from urea and formaldehyde form compositions which are absolutely homogeneous throughout.

Of urea derivatives thiourea is particularly suitable for use in this process.

As used in the appended claims the term "an urea" includes urea, thiourea and those derivatives having the common characteristic structure:

where X is hydrogen or a monovalent substituent and Y is oxygen or sulphur.

What I claim is:

1. A process for the production of a material which is capable of being pressed, by the condensation of an urea and formaldehyde, characterized by the fact that the solution of a sol obtained by said condensation of said materials, is materially diluted with water to such an extent that no gelatinization can take place during the subsequent treatment, and thereupon a dehydrated, apparently amorphous, flocculent precipitate is thrown down from the diluted solution by the addition of a flocculating agent of the class consisting of electrolytes and albumin precipitants, and recovering the precipitate.

2. A method of carrying out the process according to claim 1, characterized by the fact that the mixture of the initial products or the condensation product produced primarily by briefly warming this mixture, is materially diluted with water to such an extent that no gelatinization can take place during the subsequent treatment and is then treated with sufficient quantities of flocculating agents and further heated to such an extent that the dehydrated, flocculent precipitate is formed in one operation.

3. A process as claimed in claim 1 characterized by the fact that the precipitate is washed and dried, whereby a finely divided powder suitable for pressing is produced.

4. A process which comprises condensing formaldehyde with a urea material and thereafter materially diluting with water to an extent that gelatinization cannot occur upon heating, and adding a flocculating agent selected from the herein described class consisting of electrolytes and albumin precipitants.

5. The herein described new amorphous, finely divided material, capable of being pressed into molded articles, which material has the properties of a product made by materially diluting the solution of the sol obtained by condensation of an urea and formaldehyde, with water, to such extent that no gelatinization can take place therein during the subsequent treatment, and adding a flocculating agent thereto sufficient to precipitate a dehydrated apparently amorphous flocculent precipitate, and recovering said precipitate.

6. A process for the production of a material which is capable of being pressed, by the condensation of an urea and formaldehyde, characterized by the fact that the solution of a sol obtained by said condensation of said materials, is materially diluted with water to such an extent that no gelatinization can take place during the subsequent treatment, and thereupon a dehydrated, apparently amorphous, flocculent precipitate is thrown down from the diluted solution by the addition of a suitable flocculating agent for said condensation product, and recovering the precipitate.

7. A process for the production of a material which is capable of being pressed, by the condensation of an urea and formaldehyde, characterized by the fact that the solution of a sol obtained by said condensation of said materials, is materially diluted with water to such an extent that no gelatinization can take place during the subsequent treatment, and thereupon a dehydrated, apparently amorphous, flocculent precipitate is thrown down from the diluted solution by the addition of electrolytes, and recovering the precipitate.

8. A method of carrying out the process according to claim 1, characterized by the fact that the mixture of the initial products of the condensation product produced primarily by briefly warming this mixture, is materially diluted with water to such an extent that no gelatinization can take place during the subsequent treatment and is then treated with suitable flocculating agents for said condensation product, and further heated to such an extent that the dehydrated, flocculent precipitate is formed in one operation, and recovering said precipitate.

9. A process for the production of a material which is capable of being molded, by the condensation of an urea and formaldehyde, characterized by the fact that the solution of a sol obtained by said condensation of said materials is materially diluted with water to such an extent that no gelatinization can take place during the subsequent treatment, adding a filler and then adding a flocculating agent of the class consisting of electrolyte and albumin precipitants, whereupon a dehydrated, apparently amorphous precipitate containing the filler admixed therewith is thrown down from the diluted solution, and recovering the precipitated material.

10. A process for the production of a material which is capable of being molded, which comprises reacting urea and formaldehyde in an initial step of condensation, then adding thiourea and continuing the condensation in a second step, the above steps being carried out in such a manner that gelatinization is prevented by materially diluting the condensation solution with water, and then adding a flocculating agent of the class consisting of electrolytes and albumin precipitants, whereupon a dehydrated, apparently amorphous precipitate is thrown down from the diluted solution.

11. A process which comprises condensing formaldehyde with an urea, diluting the sol with water to such a degree that about 150 grams of the urea material is contained in a liter of liquid, and adding a flocculating agent selected from the herein described class consisting of electrolyte and albumin precipitants.

12. In a process for the production of a material which is capable of being molded under heat and pressure, the improvement which comprises forming a dilute reaction mass of an urea and formaldehyde in water and at such concentration that no gelatinization takes place during subsequent treatment, and effecting formation of a precipitate in such dilute mass by adding thereto a flocculating agent of the class consisting of electrolytes and albumin precipitants.

KURT RIPPER.